United States Patent [19]

Komatsu

[11] Patent Number: 4,778,240
[45] Date of Patent: Oct. 18, 1988

[54] PIN JACK WITH AN OPTICAL ELEMENT HOLDER

[75] Inventor: Yasuhiro Komatsu, Osaka, Japan
[73] Assignee: Hosiden Electronics Co., Ltd., Osaka, Japan
[21] Appl. No.: 153,382
[22] Filed: Feb. 8, 1988
[30] Foreign Application Priority Data Feb. 12, 1987 [JP] Japan .......................... 62-19483[U]

[51] Int. Cl.⁴ .................... G02B 7/26; H01R 33/96
[52] U.S. Cl. .................... 350/96.20; 200/51.09; 200/51.10
[58] Field of Search ............. 350/96.15, 96.18, 96.20, 350/96.21, 96.22; 357/30 M; 250/227; 200/51.09, 51.10

[56] References Cited

U.S. PATENT DOCUMENTS

| | | | |
|---|---|---|---|
| 4,256,936 | 3/1981 | Lancaster | 200/51.07 |
| 4,426,558 | 1/1984 | Tanaka et al. | 200/51.09 |
| 4,461,537 | 7/1984 | Raymer, III et al. | 350/96.20 |
| 4,479,696 | 10/1984 | Lubin et al. | 350/96.20 |
| 4,533,209 | 8/1985 | Segerson et al. | 350/96.20 |
| 4,539,476 | 9/1985 | Donuma et al. | 250/227 |
| 4,549,783 | 10/1985 | Schmachtenberg, III | 350/96.20 |
| 4,633,048 | 12/1986 | Komatsu | 200/51.10 |
| 4,684,210 | 8/1987 | Matsunaga et al. | 350/96.20 |
| 4,721,358 | 1/1988 | Faber et al. | 350/96.21 |

Primary Examiner—William L. Sikes
Assistant Examiner—Frank González
Attorney, Agent, or Firm—Pollock, Vande Sande and Priddy

[57] ABSTRACT

The pin jack body made of an insulating material has a through hole, for receiving the mating pin contact, the front part of the pin jack body is covered with a metal cover, and the through hole of the pin jack body has housed therein a jack contact. An optical element holder is mounted on the back of the pin jack body. The optical element holder has a guide hole axially aligned with the through hole. When an optical element is inserted into the holder, the light emitting or light receiving face of the optical element faces opposite the through hole through the guide hole.

9 Claims, 5 Drawing Sheets

PIN JACK WITH AN OPTICAL ELEMENT HOLDER

BACKGROUND OF THE INVENTION

The present invention relates to a pin jack with an optical element holder which can be electrically coupled with an electric pin plug and can be coupled with an optical pin plug as well.

A conventional pin jack is designed for only electrical connection with a pin plug. On the other hand, an optical connector entirely differs in mechanical configuration from a conventional electric connector, in particular, a connector composed of a pin jack and a pin plug. Conventionally, when an optical jack is mounted on a circuit board in place of an electric pin jack, it is necessary to change not only the optical design but also the mechanical design of the circuit board. Similarly, in the case of replacing the optical jack with an electric pin jack for a circuit board designed for attaching the optical jack, it is necessary to change the mechanical design of the circuit board.

It is therefore an object of the present invention to provide a pin jack with an optical element holder which can be electrically coupled with an electric pin plug and can be coupled with an optical pin plug, without the necessity of changing the mechanical design of the pin jack itself and the mating pin plug.

SUMMARY OF THE INVENTION

According to the present invention, the pin jack body made of an insulating material has a through hole for receiving the mating pin contact, and the front part of the pin jack body is covered with a metal cover. The through hole of the pin jack body has housed therein a jack contact, and an optical element holder is mounted on the back of the pin jack body. The holder has a guide hole of a predetermined diameter which is axially aligned with the guide hole. When an optical element is inserted into the holder, the light emitting or light receiving face of the optical element can be disposed accurately in alignment with the through hole through the guide hole.

BRIEF DESCRIPTION OF THE DRAWINGS

FIG. 4A is a perspective view of a movable contact piece 16a;

DESCRIPTION OF THE PREFERRED EMBODIMENTS

With reference to the accompanying drawings, embodiments of the present invention will hereinafter be described.

Figure 1:
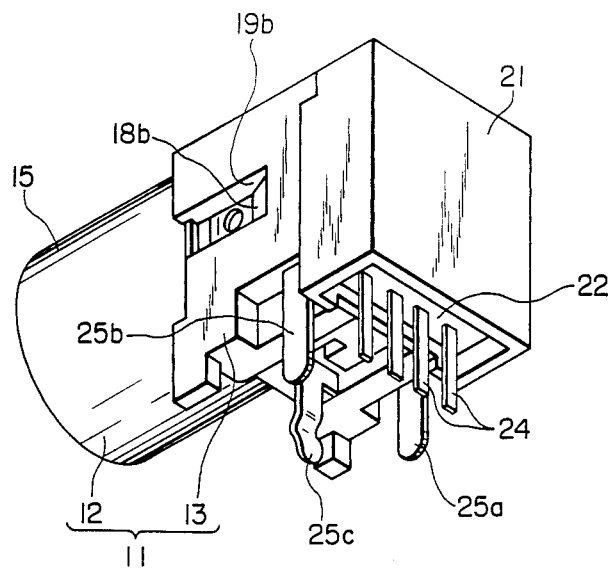
FIG. 1 is a perspective view showing an example of the pin jack with an optical element holder according to the present invention.
Figure 2A:
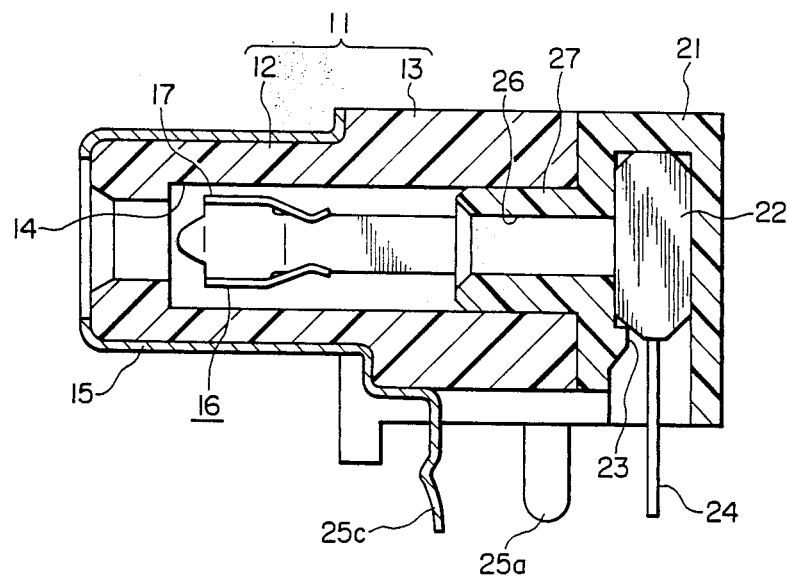
FIG. 2A is a vertical-sectional view of the pin jack.

As shown in FIG. 1, a pin jack body 11, which is a molding of an insulating material, comprises a cylindrical portion 12 and a box-shaped portion 13. The pin jack body 11 has, as shown in FIG. 2A, a through hole 14 extending therethrough in its front-to-back direction, for receiving a pin contact of the mating pin plug. Reference numeral 15 indicates a metal cover mounted around the cylindrical portion 12.

Figure 2B:
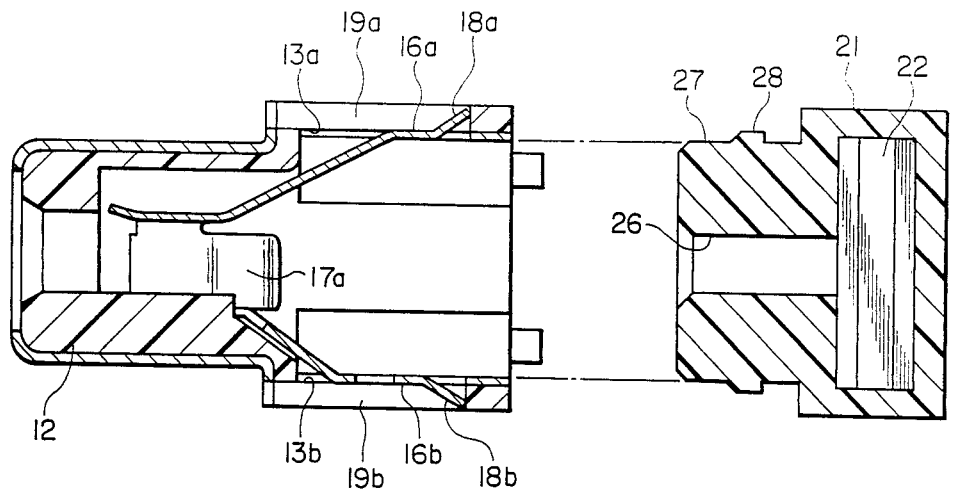
FIG. 2B is a horizontal-sectional view of the pin jack.
Figure 3:
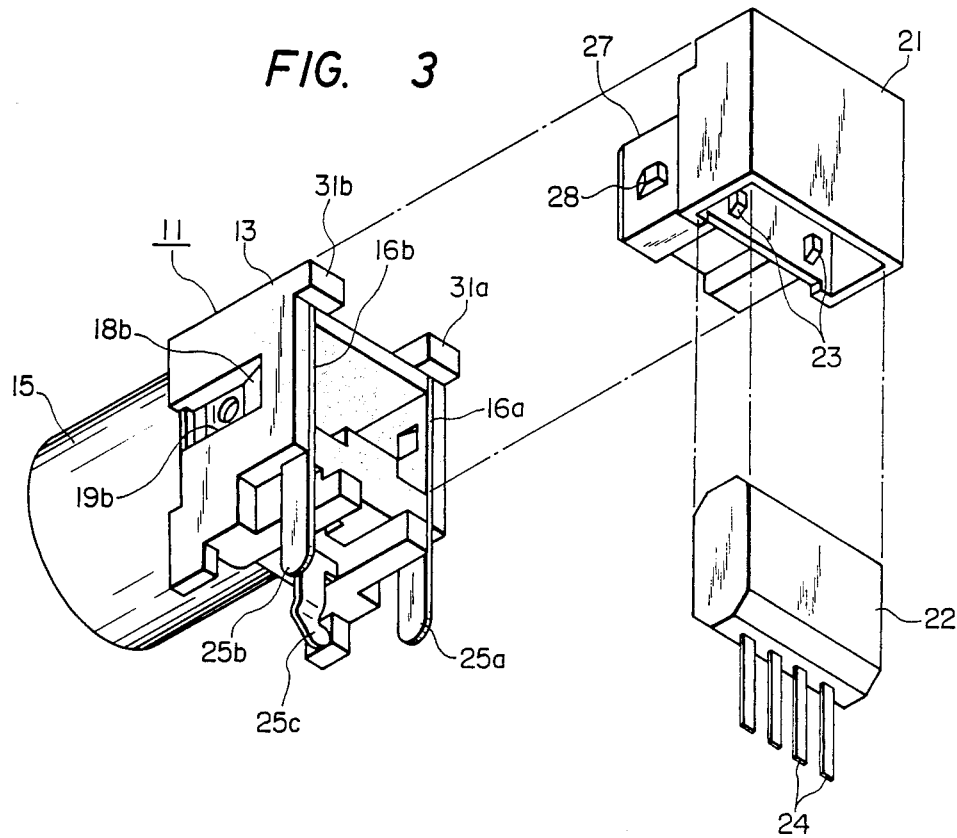
FIG. 3 is an exploded perspective view of the pin jack.
Figure 4B:
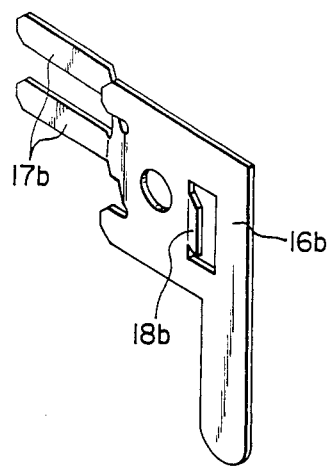
FIG. 4B is a perspective view of a fixed contact piece 16b.
Figure 4A:
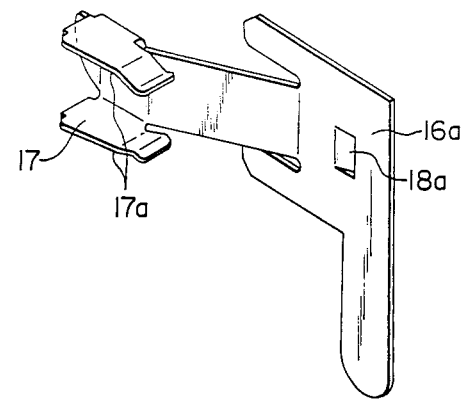

As depicted in FIGS. 2A, 2B and 3, the through hole 14 has housed therein a jack contact 16. In this example, the jack contact 16 is composed of a movable contact piece 16a and a fixed contact piece 16b. When a pin contact of the mating pin plug is inserted into the through hole 14, a contact portion 17a of the movable contact 16a is moved away from contact portion 17b of the fixed contact piece 16b, and when the pin contact is pulled out of the through hole 14, the contact portion 17a resiliently contacts the contact portion 17b of the fixed contact piece 16b. Thus, the jack contact 16 performs a switching operation.

The base portions of the movable and fixed contact pieces 16a and 16b are held in engaging grooves 13a and 3b formed in the box-shaped portion 13 along its opposite inner surfaces. The contact portion 17a of the movable contact piece 16a and the contact portion 17b of the fixed contact piece 16b are inserted in the cylindrical portion 12, as depicted in FIGS. 2A and 2B. The base portions of the movable and fixed contact pieces 16a and 16b have pawls 18a and 18b standing out on the outside thereof, respectively. When the movable and fixed contact pieces 16a and 16b are put in the pin jack body 11 along its both side walls, the pawls 18a and 18b are engaged with recesses 19a and 19b made in both side walls, respectively, thereby preventing the contact pieces 16a and 16b from falling out of the body 11 (see FIG. 5).

The above-described structure is basically identical with that of the conventional electric pin jack.

In the present invention, an optical element holder 21 is mounted on the back of the body 11. The holder 21 is produced separately of the body 11 and assembled therewith. The holder 21 holds therein an optical element 22. The holder 21 has a box-like configuration, with its bottom open, and the optical element 22 is inserted into the holder 21 from underneath, in which it is positioned and retained by protrusions 23. Terminals 24 of the optical element 22 extend down and terminals 25a, 25b and 25c of the contact pieces 16a and 16b and the cover 15 also extend down.

Figure 6:
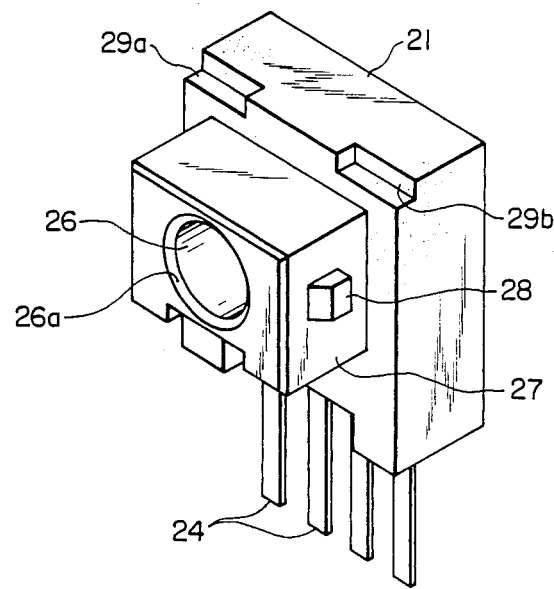
FIG. 6 is a perspective view of the optical element holder 21.

The light emitting or light receiving face of the optical element 22 is opposite a guide hole 26 (FIG. 6) of the holder 21 and the guide hole 26 is opposite the through hole 14 of the body 11. The tip end portion of a ferrule of an optical pin plug is inserted into the guide hole 26. Reference numeral 27 indicates a block portion molded integrally with the holder 21 on the front thereof, i.e. on the side of the through hole 14 of the body 11. The block portion 27 has the circular guide hole 26 which communicates with the inside of the holder 21 so that the tip end portion of the ferrule of the optical pin plug inserted through the through hole 14 may be fitted in the guide hole 26. The front marginal edge of the guide hole 26 is tapered as indicated by 26a. The inner diameter of the guide hole 26 is selected slightly larger than the diameter of the ferrule so that the center of the light emitting or light receiving face of the optical element 22 and the optical axis of an optical fiber in the ferrule inserted into the guide hole 26 may be aligned with each other within a given positioning error in a radial direction relative to the light emitting or receiving face of the optical element 22.

Figure 5:
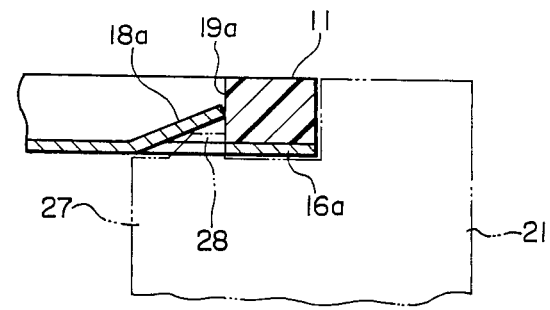
FIG. 5 is a sectional view showing an example of a mechanism for locking the contact piece and an optical element holder 21 to the pin jack body 11.

The block portion 27 of the holder 21 is fitted into the box-shaped portion 13 of the body 11 from behind. In this case, pawls 28 on both sides of the block portion 27 are engaged with square holes which were made in the contact pieces 16a and 16b as a result of the formation of the pawls 18a and 18b, as shown in FIG. 5. This prevents the holder 21 from falling out of the body 11 and permits positioning of the former in the direction of its insertion into the latter. Furthermore, in this example, the holder 21 has recesses 29a and 29b made in the front edge of its top at the opposing corners, and the box-shaped portion 13 has protrusions 31a and 31b extending from its upper rear edge at opposite ends, for engagement with the recesses 29a and 29b.

Figure 7:
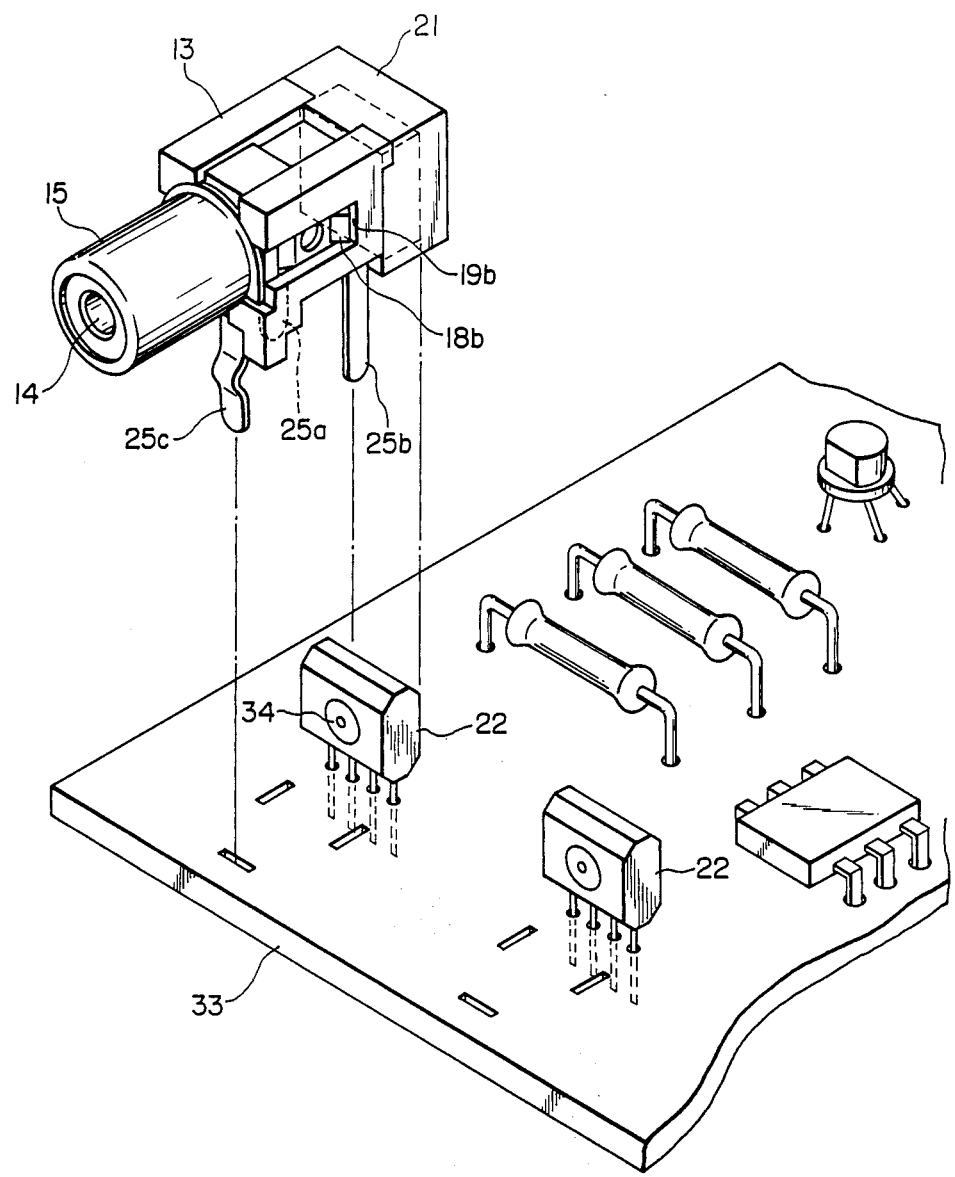
FIG. 7 is a perspective view showing an example of forming the pin jack of the present invention in a state in which an optical element is mounted on a printed-circuit board.

The optical element 22 may also be mounted first on a printed-circuit board 33 and then fitted into the holder 21, as shown in FIG. 7, for instance. By inserting the optical element 22 into the holder 21, the light emitting (or light receiving) face 34 of the optical element 22 is positioned opposite the guide hole 26 of the holder 21.

Figure 8:
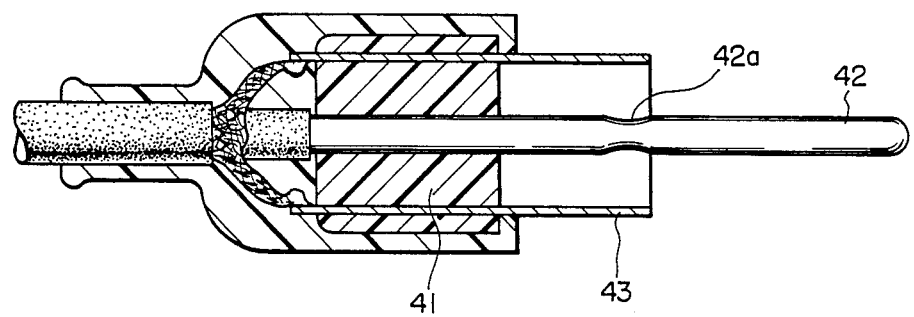
FIG. 8 is a sectional view of an electric pin plug.

The pin jack with an optical element holder according to the present invention can be used with either an electric pin plug or optical pin plug. For example, the electric pin plug has such a structure as shown in FIG. 8, in which a plug body 41 of an insulating material holds a pin contact 42 inserted thereinto and has a metal sleeve 43 extending forwardly of the body 41 and coaxially with the pin contact 42. The pin contact 42 of this pin plug is inserted into the through hole 14 of the pin jack of the present invention and the metal cover 15 is fitted into the metal sleeve 43. At this time, the contact portion 17a of the movable contact piece 16a is pressed away from the fixed contact piece 16b, by the pin contact 42, and an annular recess 42a of the pin contact 42 is resiliently gripped by two tongues of the contact portion 17a, establishing electrical connection between the contact portion 17a and the pin contact 42. That is, the pin jack of the present invention functions as an ordinary electric pin jack.

Figure 9:
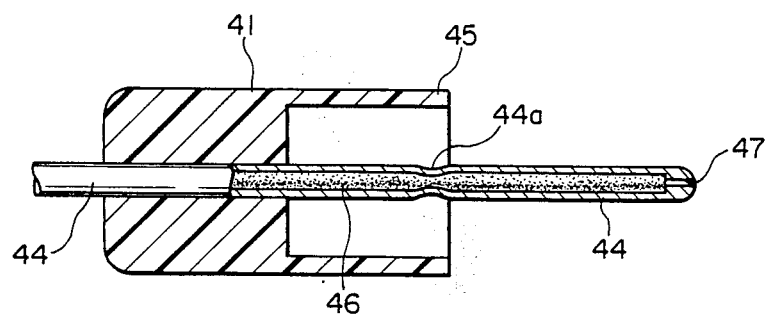
FIG. 9 is a sectional view of an optical pin plug.

The optical plug has such a structure as depicted in FIG. 9 in which the plug body 41 has a cylindrical portion 45 integrally molded therewith and holds a ferrule 44 inserted therethrough coaxially with the cylindrical portion 45, the ferrule 44 fixedly holds an optical fiber cable 46 inserted thereinto and an optical fiber 47 of the optical fiber cable 46 is fitted and positioned in a hole made in the tip of the ferrule 44. The front end portion of the ferrule 44 projects out of the cylindrical portion 45. When inserted in the through hole 14, the ferrule 44 is positioned by the guide hole 26 of the block portion 27 in FIG. 6 and the tip of the optical fiber 47 is disposed opposite the light emitting portion (or light receiving portion) 34 of the optical element 22. At this time, the two tongues 17a of the movable contact piece 16a resiliently click into engagement with the annular groove 44a of the ferrule 44. The resiliency of the tongues 17a is applied to the front edge of the annular groove 44a, urging the ferrule 44 toward the optical element 22. The resilient displacement of the foot of the contact piece 17a also presses the ferrule 44 toward the optical element 22. The inner diameter of the cylindrical portion 45 is selected larger than the outer diameter of the metal cover 15 and the resiliency of the tongues 17a and the foot thereof serves to position the tip of the ferrule 44 as close to the optical element 22 as possible.

As described above, the pin jack with an optical element holder according to the present invention is substantially identical in shape with the conventional pin jack and can be used with both electric and optical pin plugs; namely, an electric or optical pin plug needs only to be inserted into this pin jack according to the individual purpose of obtaining electric or optical connection. Accordingly, any special pin jacks need not be used for electric and optical connections, nd consequently there is no need of modifying the mechanical design of the pin jack. Therefore, this pin jack can be attached to a set simply by utilizing a conventional mechanical design which uses coupling of the pin connector and the pin jack. Thus, the present invention is of great utility when employed in practice.

The embodiment shown in FIGS. 1 through 6 can be implemented simply by attaching the optical element holder 21 to the conventional electric pin jack, and hence is easy of manufacture.

Moreover, in the case of optical connection, the pin jack contact for the electric connection resiliently holds and positions the ferrule, and the guide hole 26 of the holder 21 serves to align the optical axes of the optical fiber and the optical element; and so that the dimensional accuracy of the pin jack body need not be particularly high.

With such structures as shown in FIGS. 1 to 6, the parts of the pin jack, except the optical element 22, can be fabricated at low cost, and the optical element 22 needs only to be inserted into the holder 21, as required, by the user, besides it can be done very easily. This permits the user to use a desired optical element according to the required optical coupling characteristic.

It will be apparent that many modifications and variations may be effected without departing from the scope of the novel concepts of the present invention.

What is claimed is:

1. A pin jack with an optical element holder comprising:
   a body made of an insulating material and having portion of a mating pin contact;
   a metal cover mounted around the forward portion of the body;
   a jack contact housed in the through hole of the body; and
   an optical element holder mounted on the back of the body and having a guide hole opposite the through hole.

2. The pin jack of claim 1, wherein the holder is formed separately of the body.

3. The pin jack of claim 1 or 2, wherein the front part of the body is a cylindrical portion and the rear part is a box-shaped portion, the cylindrical portion being covered with the metal cover.

4. The pin jack of claim 3, wherein the jack contact is composed of a fixed contact piece and a movable contact piece urged against the fixed contact piece.

5. The pin jack of claim 4, wherein the fixed contact piece and the movable contact piece are each attached to the inside of one of the opposite side walls of the box-shaped portion, and pawls extending from said contact pieces are engaged with recesses made in both side walls, respectively.

6. The pin jack of claim 5, wherein the holder has, on its front, a block portion integrally molded therewith and said block portion has said guide hole therein.

7. The pin jack of claim 6, wherein the block portion has engaging pawls integrally molded therewith on both sides and the engaging pawls are engaged with square holes defined by the pawls of the base portions of the fixed contact piece and the movable contact piece.

8. The pin jack of claim 1 or 2, wherein the bottom of the holder is open and an optical element is fitted in the holder by inserting it from underneath through the open bottom.

9. The pin jack of claim 8, wherein an inner wall of the holder has a protrusion integrally formed therewith for positioning the optical element.

* * * * *